May 13, 1941. J. J. JAKOSKY Re. 21,797

METHOD AND APPARATUS FOR ALTERNATING-CURRENT INVESTIGATION OF UNCASED DRILL HOLES

Original Filed Jan. 12, 1934 3 Sheets-Sheet 1

John J. Jakosky, INVENTOR.

METHOD AND APPARATUS FOR ALTERNATING-CURRENT INVESTIGATION OF UNCASED DRILL HOLES

Original Filed Jan. 12, 1934 3 Sheets-Sheet 2

John J. Jakosky
INVENTOR.

John Jay Jakosky,
INVENTOR.

Reissued May 13, 1941 Re. 21,797

UNITED STATES PATENT OFFICE 21,797

METHOD AND APPARATUS FOR ALTERNATING-CURRENT INVESTIGATION OF UNCASED DRILL HOLES

John Jay Jakosky, Los Angeles, Calif., assignor to Schlumberger Well Surveying Corporation, Houston, Tex., a corporation of Delaware Original No. 2,038,046, dated April 21, 1936, Serial No. 706,391, January 12, 1934. Application for reissue April 12, 1938, Serial No. 201,649

21 Claims. (Cl. 175—182)

This invention relates to a method and apparatus for investigating the nature of subsurface strata by electrical means, and in particular for conducting investigations inside of bore or drill-holes or other uniform openings in the earth. The object of the invention is to improve the procedure now employed and to increase the accuracy of the deductions which may be made when interpreting the results of the investigation.

Previous methods have been proposed for subsurface investigations in bore-holes. The most prominent of these methods involves measurement of the specific resistivity of the various strata through which the drill-hole has penetrated (U. S. Patent No. 1,819,923). In another method, a wire, constituting the counterpoise of a high-frequency antenna or radio system is placed inside the drill hole and then by noting the difference in the resistance characteristic of the antenna at different wave lengths, predictions are made relative to the proximity of the greater conducting bodies, as compared to similar tests in virgin areas (U. S. Patent No. 1,652,227). A similar system is proposed by U. S. Patent No. 1,092,065 by placing a previously calibrated antenna system in parts of a mine, and noting the capacity required to tune the apparatus to a predetermined frequency again, or the change in the frequency and the damping coefficient of the apparatus. A fourth arrangement utilizes changes in potential between two surface points, as one electrode of the current supply is lowered into the bore-hole, while the other terminal of the current supply is placed at the surface of the ground (U. S. Patent No. 1,863,542).

The first and fourth methods (resistivity) above described depend for their operation (when used in oil fields) chiefly upon the high resistance of an oil-impregnated sand as compared to a sand impregnated with water. By plotting a curve showing resistance versus depth, attempts are made to determine the location and thickness of the oil-bearing sands, by means of the changes in resistivity values.

I have developed a high-frequency, alternating-current method for accurately measuring the impedance losses, power factor, and the dielectric constants of the various strata penetrated by the drill-hole. The method consists essentially of lowering into the bore-hole a cable carrying at its lower end an extended electrode system. These electrodes are supported by an insulator spacer which retains them in rigid spatial relation to each other. They are also connected, by insulated conductive wires passing through the cable from which they are suspended, with a source of alternating current at the surface of the ground and proper measuring apparatus. In its simplest form, the electrode system may comprise two extended electrodes. The dielectric and conductive material, within the sphere of the electrodes (of which a small part is the insulative spacer or support which holds the electrodes in rigid spatial relation and the fluid in the drill-hole), consist principally of the earth materials surrounding the uncased bore-hole and extending laterally in all directions to a considerable distance.

The various features of novelty which characterize my invention are pointed out in the appended claims. For a more complete understanding of the invention, however, reference should be made to the accompanying drawings and descriptive matter. Of the drawings:

Figure 6:
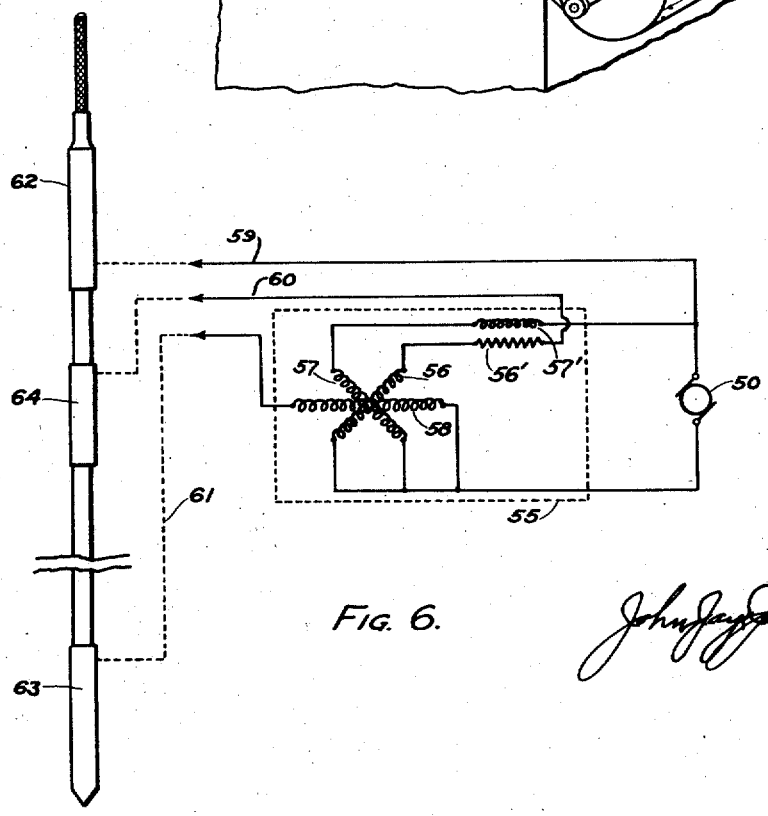

Figure 6 is a diagrammatic representation of apparatus and electrode system for measuring variations in power factor or phase shift between the current and the potential circuits, when energizing the subsurface by means of alternating current flowing between two electrodes, and using the potential created between two auxiliary electrodes, one or both of the energizing electrodes being separate from the two potential electrodes.

Figure 1:
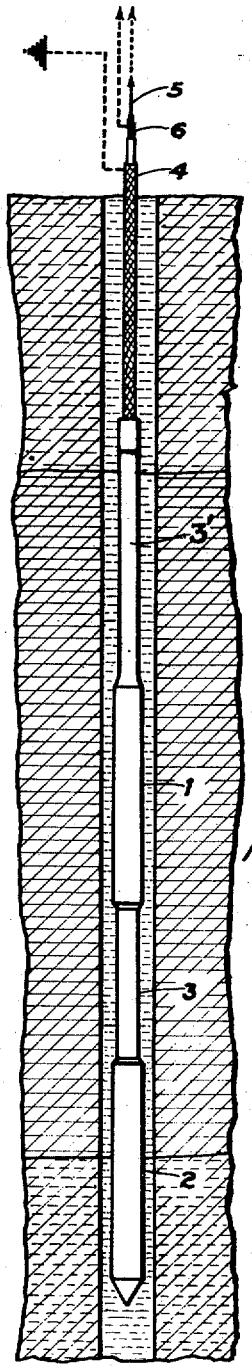
Figure 1 is a vertical section of the earth showing a portion of a drill-hole and one form of electrode system and supporting cable.

The high-frequency circuit, of which the electrode system and the cable of Figure 1 form a part, contains resistance, inductance and capacity, so as to satisfy the relation (assuming lumped values of L and C)

$$f=\frac{1}{2\pi\sqrt{LC}}$$

where $f$=frequency in cycles per second
L=inductance in henries
C=capacity in farads.

At resonance the power factor of the circuit becomes unity and a maximum current passes. The adjustment to resonance is sharply sensitive and affords a delicate indicator of deviations from the above relation between inductance and capacity.

In the forms of apparatus described, the inductance is of low value and approximately constant, whereas the capacitance is high and appreciably affected by the formations surrounding the drill-hole. It is therefore only necessary to adjust capacitance in the various types of bridge circuit in order to secure resonance.

In a high-frequency radiating circuit, electric energy is dissipated in three different ways: first, energy is dissipated in ohmic resistance of the circuit, the loss being equal to the product of the current squared by the resistance. Second, the circuit loses energy by radiation, this energy being carried by the electric wave traveling outward into space. This radiated energy will perform work by the setting-up of currents in conducting materials or circuits placed in the path of the wave. The amount of energy radiated is proportional to the square of the frequency. It is also proportional to the square of the current in the radiating circuit. Third, energy is lost to the surrounding dielectric due to the so-called "dielectric hysteresis". When using a sufficiently high frequency and because the surrounding dielectric is not perfect, the alternating fields extending from the radiating circuit lose energy due to its absorption by the medium. This is also known as "dielectric absorption" and this loss is inversely proportional to the frequency.

The various energy losses in the circuit may be treated mathematically by assuming them to be $I^2R$ losses in real resistance or in various hypothetical "equivalent" resistances.

The dielectric absorption in a given condenser system is found experimentally to be proportional to the energy stored in the condenser during each half cycle. The series resistance equivalent to this loss may be determined as follows. (Moullin, Radio Frequency Measurements, p. 140, Chas. Griffin & Co., Ltd., London.)

$$kfCE^2=I^2R$$
$$=4\pi^2f^2E^2C^2R$$
$$R=\frac{k}{4\pi^2fC}$$

where $k$=the proportionality constant for dielectric absorption
$f$=frequency in cycles per second
C=capacity of condenser in farads
E=effective electromotive force impressed on condenser in volts
I=effective current through condenser in amperes
R=equivalent resistance of condenser in ohms Under the conditions encountered in use of a drill-hole survey apparatus, moreover, the insulation of the condenser (existing between the terminal plates) is imperfect and the apparent equivalent series resistance varies inversely as the square of the frequency as shown by the following equations for a condenser, having a non-inductive resistance $r$ in parallel with it. (Moullin, l. c.)

$$Z=\frac{r}{1+4\pi^2f^2r^2C^2}-j\frac{2\pi fCr^2}{1+4\pi^2f^2r^2C^2}$$

where Z is the impedance. The first term in the right-hand member of the equation may be interpreted as a series resistance R in phase with the current flowing through the condenser, so that $$R=\frac{r}{1+4\pi^2f^2r^2C^2}$$
$$=\frac{1}{4\pi^2f^2rC^2}\text{ when }4\pi^2f^2r^2C^2\gg1$$

The condenser losses of energy due both to the dielectric absorption and to the leakage, or current conduction, may therefore be grouped together as a resistance in series with the condenser, and if the power factor ($\cos\theta$) of the condenser is small, the equivalent series resistance is given approximately by the equation $$R=\frac{\cos\theta}{2\pi fC}$$

It will also be seen that the power factor of the system varies with the resistance and capacity.

The higher the frequency, the less become the effects of current conduction through a leaky dielectric. In order to obtain the greatest benefits of dielectric phenomena, the preferred condition contemplated by this invention, it is essential that high frequencies be employed. The frequency must be sufficiently high to cause a measurable shift in phase between the current and potential components.

The use of a high-frequency current also minimizes the contact resistance occurring at the electrodes. The contact resistance is usually a serious variable when measurements are made with direct current. This contact resistance effect is minimized, when high frequencies are employed, probably by two factors: (1) elimination of polarization and electrolysis effects; and (2) the high capacity existing at the contact of the electrolyte (impure water of the drill-hole) and the electrode. This electrolytic capacity effect is enhanced when the electrodes are constructed from aluminum or similar oxidizable material. In oil wells an electrolyte consisting of water and drilling mud is always present.

The dielectric constants of earth strata vary in significant degree. For example a majority of the following figures were taken from International Critical Tables, vol. VI, p. 105.

| | |
|---|---|
| Granite | 3 to 4 |
| Dry sand | 2.5 |
| Wet said (15% $H_2O$) | ca 9 |
| Petroleum | ca 2.5 to 3 |
| Oil-impregnated sandstone | 3 to 4 |
| Sandstone | 9 to 11 |
| Dry soil | 1.9 |
| Soil (8% $H_2O$) | ca 8 |
| Water | 80 |
| Limestone | 8 |

Some indication of the range of frequencies required for obtaining good results in accordance with the invention may be obtained by calculation, using the above constants and well known electrical principles. This may be done by calculating the frequency required to give the electrode a phase angle of 1° when it is suspended in a medium of known resistivity and known dielectric constant. The resistivity of the important formations usually encountered in oil field practice varies from about 10 ohm-meters to approximately 200 ohm-meters.

At page 351 of "Electricity and Magnetism" by J. H. Jeans, fourth edition, the relation between the capacitance (C) and resistance (R) of a body in air is given as $$CR=\frac{\rho}{4\pi}$$

where $\rho$ is the resistivity of the medium and $\pi=3.14$. If R is expressed in ohms, $\rho$ is in ohm-centimeters. If the body, in this case an electrode, is immersed in a medium of dielectric constant K and if the capacitance (C) is expressed in farads instead of in electromagnetic units, the foregoing can be expressed as a ratio of resistance (R) to capacity reactance (X) for a frequency ($f$) as follows:

$$\frac{R}{X}=\frac{K\rho f}{1.8\times10^{12}}$$

From this formula, calculations show that the phase angle of the electrode will be one degree when the frequency and the resistivity, and dielectric constant of the medium are as follows:

| $f$ | $\rho$ | K |
|---|---|---|
| *Cycles* | *Ohm-meters* | |
| 157,000 | 200 | 10 |
| 785,000 | 200 | 2 |
| 1,570,000 | 100 | 2 |
| 15,700,000 | 10 | 2 |

These illustrative calculations are sufficient to show the results to be expected when some of the dielectric constants tabulated above obtain. Calculations for the others can be made.

Fundamental electrical theory shows that the capacity of a two-plate condenser is represented by the approximate equation:

$$C=\frac{KA}{4\pi d}$$

where C=capacity in cm.
K=specific inductive capacity of dielectric
A=area of one side of one plate in cm.$^2$
$d$=separation of plates in cm.

(Morecroft, Principles of Radio Communication, p. 214, Wiley and Sons.)

Capacities of less simple forms of condenser are not readily expressed in mathematical formulae, but in general the principle holds that the capacities are approximately directly proportional to the specific inductive, or dielectric, capacities of their dielectrics. The above equation assumes a perfect dielectric, that is, one which will pass no current when a steady electromotive force is applied to its terminals, and which will consume no energy when subjected to alternating electromotive forces. Under these theoretically ideal conditions, the power factor is 90 degrees leading. As previously discussed, none of these conditions holds for dielectric earth materials. Direct or indirect measurement of the dielectric losses occurring in the various strata through which the drill-hole penetrates therefore furnishes a reliable and particularly advantageous method of logging the thickness of the various strata, and in particular of differentiating between essentially oil-impregnated materials and water-impregnated materials; and between oil-impregnated and certain impervious rocks.

In the simple application of the apparatus described later, the total impedance governs the effects measured. Under these conditions, no attempt is made to differentiate between the effects of resistance, dielectric value and dielectric losses. All of these factors govern the radiation loss and the impedance. Since the relative resistances of various strata vary from 6 to 15, it is impossible to obtain an idea of the true dielectric properties of the materials, merely by measuring the changes in radiation resistance of a high-frequency system, although, as previously mentioned, the higher the frequency, the less becomes the effect of the resistance losses.

In the preferred method herein described, the undesired resistance component may be eliminated by use of (*a*) a proper bridge circuit for measuring capacity; and (*b*) by making measurements at different frequencies. In practice it has been found best to log depth-dielectric or depth-capacity measurements at one frequency during the descent into the drill-hole, and then log a second series of measurements at a different frequency during the ascent. This gives two curves from which the dielectric property in the subsurface may be evaluated more accurately. The process of obtaining the depth-dielectric log may be termed "dielectric coring".

Employing an approximately tuned circuit increases the sensitivity and facilitates measurement of the impedance, or any of its components. The resistance and capacity components are the two major variable quantities which change with the strata through which the measuring device passes. In some cases the impedance variations (composed of the resistance and the capacity components in space quadrature) will give data indicative of the strata, but as a general rule I prefer to carry out the field measurements in such a manner as to determine the capacity component most accurately. This allows determination of the dielectric value of the strata, with the resultant advantage of more accurate differentiation of the various strata. At certain points where more detailed data may be desirable, it is oftentimes of advantage to carry out a complete series of measurements to determine the changes in the alternating current characteristics of those particular formations at different frequencies. This can be done by stopping the electrode system at the desired depth and obtaining data showing variations of the alternating current characteristics such as impedance, power factor, capacity, at the different frequencies.

Various types of measuring device and circuit arrangement may be employed for measuring or continuously recording the changes in alternating-current impedance, power factor, or capacity as the electrodes traverse the drill-hole. These devices are well known and the following descriptions of circuit arrangements are included herein chiefly for the purpose of clarifying the field operation of the method, and should not be considered as limiting this method for use with any certain type of measuring circuit. The sensitivity of the indicating devices may usually be increased if desired by the use of one or more stages of vacuum-tube amplification.

One form of electrode system is illustrated in Figure 1 and comprises metal electrodes 1 and 2 spaced a predetermined distance apart on an insulator tube 3 and 3'. The upper end of insulator 3' is mechanically fastened to the steel braid forming the outer sleeve 4 of an insulated two-conductor cable. The sleeve 4 is of sufficient mechanical strength to support the entire weight of the cable and allow the proper factor of safety. Concentric insulated conductors 5 and 6 of the cable are connected to the terminals 1 and 2. The cable may be fastened to a suitable reel or drum (not shown) to allow the assembly to be lowered or raised within the drill-hole. The inside ends of the cable on the drum, constituting the other ends of conductors 5 and 6, may be connected to a commutator fastened to the drum, and thence to an electrostatic wattmeter and alternating-current power supply for measuring the impedance changes of the system or to an alternating-current bridge for measuring the capacity changes of the system, or to a power-factor meter for measuring the changes in power factor of the system. The outer steel sleeve 4 of the cable is grounded.

The electrostatic wattmeter, power-factor meters and the bridges are of the conventional type and need not be described in complete detail here. Brief outline of the circuits, however, are given later. For further particulars see "Alternating Current Bridge Methods" by B. Hague, Pittman and Sons, Ltd., and "Absolute Measurements of Capacity", Bureau of Standards, 1904, vol. 1, and "Dictionary of Applied Physics" by R. Glazebrook, vol. 2, "Electricity."

Figure 1A:
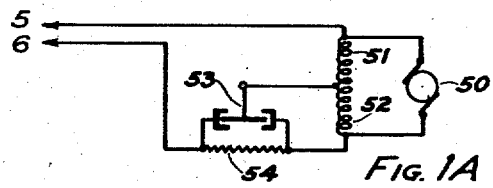
Figure 1A is a diagrammatic representation of apparatus which may be used in measuring the impedance losses of the subsurface strata.

For measuring the changes in impedance as the electrode system traverses the drill-hole the apparatus illustrated in Figures 1 and 1A is employed. In Figure 1A is shown a high-frequency, alternating-current power supply 50, voltage dividers 51 and 52, electrostatic wattmeter 53, and shunt resistor 54. The electrostatic wattmeter is preferably of the continuous photographic recording type, whereby a complete record is made of the variations in impedance as the electrode system traverses the drill-hole.

Figure 1B:
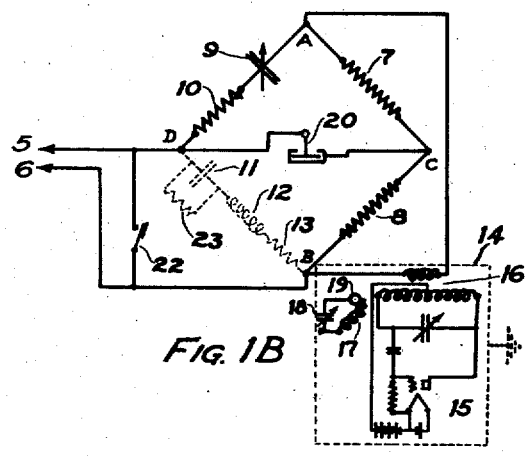
Figure 1B is a diagrammatic representation of apparatus useful for measuring the impedance and the dielectric value of the subsurface strata.

For measuring the changes in dielectric values, the apparatus indicated in Figures 1 and 1B are preferred. Referring to Figure 1B: two branches are similar resistance members 7 and 8, the other two branches of the bridge are composed of a calibrated variable condenser 9 and a calibrated variable resistor 10. The inherent capacity, inductance and resistance of the cable itself and of the electrode assembly with the surrounding strata constitute the remaining branch of the conventional bridge. These components are represented diagrammatically in the drawings by the dotted lines indicating capacity 11, inductance 12 and resistance 13.

Alternating current is supplied the bridge terminals A and B from a high-frequency generator 14. This generator may be of any desired type but for purposes of illustration I have shown a conventional, self-excited vacuum-tube oscillator circuit 15, coupled to the bridge by means of a transformer 16, having variable coupling. A calibrated wave-meter circuit comprising an inductance 17 and a calibrated condenser 18, having loose coupling with the circuit 15, is provided for determining the frequency of the system. A neon tube indicator 19 is placed in the wave-meter circuit, to indicate resonance conditions. If desired, crystal control may be employed for automatically maintaining a constant frequency in the oscillator.

Any suitable type of indicating or recording instrument may be used for showing the balance or magnitude of unbalance in the bridge circuit. For purposes of illustration I have shown an electrostatic volmeter 20 connected between the terminals C and D of the bridge.

Figure 1C:
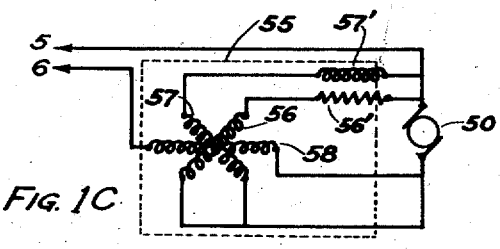
Figure 1C is a diagrammatic representation of apparatus which may be used in measuring the power factor anomalies caused by the subsurface strata.

For measuring the changes in power factor, due to variations in the resistance and capacity components of the subsurface strata, I may employ the apparatus shown in Figure 1C, in conjunction with the cable and electrode system shown in Figure 1. Alternating-current power is supplied by generator 50. The power-factor meter 55 is composed of two similar fine-wire coils 56 and 57, placed at right angles, and supported on a pivot; suitable pointer and scale being provided. This movable system is placed within the field of a fixed coil 58 which carries the current supplied the electrode system. In series with coil 56 is a resistor 56', and in series with coil 57 is an inductance 57'. Power factor is indicated by the combined effects of the fields from the coils 56, 57, and 58, and their phase relations, in accordance with well-known phenomena.

Before use of the equipment shown in Figure 1, it is desirable to make a preliminary calibration. This is usually accomplished in the following manner. The electrical characteristics of the cable and drum assembly are determined at the various frequencies at which it is desired to make measurements. These are usually obtained by short circuiting the terminals 1 and 2 through a resistance having a value comparable with the resistance of the water in the drill-hole, and lowering the assembly into a drill-hole. The capacity and dielectric loss of the cable system will also vary with the depth to which the cable is submerged, due to the high mechanical pressure exerted by the drilling fluid or mud in a deep drill-hole. Simple calculations are now made and curves plotted to obtain the normal characteristics of the system. Knowing the size and shape of the electrode system, calculations can be made to evaluate the changes in dielectric (or other) properties, encountered in surveying a well, per unit volume of material adjacent the electrodes.

In the surveying of a well for dielectric measurements, readings are usually taken at one frequency, as the apparatus is lowered into the hole. A continuous graph is plotted showing the relationship between the electrostatic voltmeter 20 (Figure 1B) reading versus the depth. Upon reaching bottom, the energizing frequency is changed to another value, and a similar set of readings obtained on the ascent of the cable. The curve obtained on the descent and the curve obtained on the ascent are both preferably used for determining the dielectric value of the materials comprising the subsurface.

If desired, the impedance apparatus shown in Figure 1A and the power-factor apparatus shown in Figure 1C may be utilized for obtaining data regarding dielectric changes, by making measurements at one frequency during descent into the well, and another set of measurements during ascent of the well. Knowing the electrical constants of the cable and associated equipment, and the two frequencies employed, calculations may be made to determine the dielectric properties of the strata traversed by the drill hole.

Figure 2:
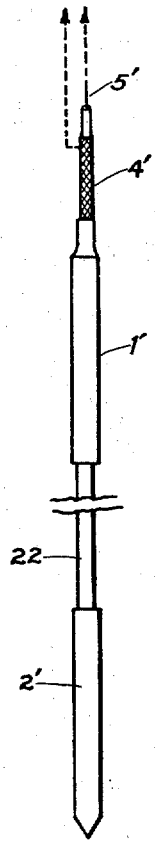
Figure 2 illustrates a simple electrode system which may be employed when using a cable consisting of only one insulated conductor and an outer steel supporting sleeve or braid.

An alternative form of electrode assembly is shown in Figure 2 and consists of a single insulated conductor 5' having a steel supporting and grounding sleeve 4'. The grounded sleeve of the cable forms one of the conductors. On the lower end of the cable is fastened the terminal 1', and an insulator tube 22, having a length approximately ten times the diameter of the drill hole. At the lower end of the insulator 22 is fastend an extended electrode 2', electrically connected to the insulated conductor 5'. Measurements are made as outlined above. In this case the flow of the high-frequency alternating current is from the terminal 2', mainly to the lower end of the cable sleeve and the terminal fastened thereto.

Figure 3:
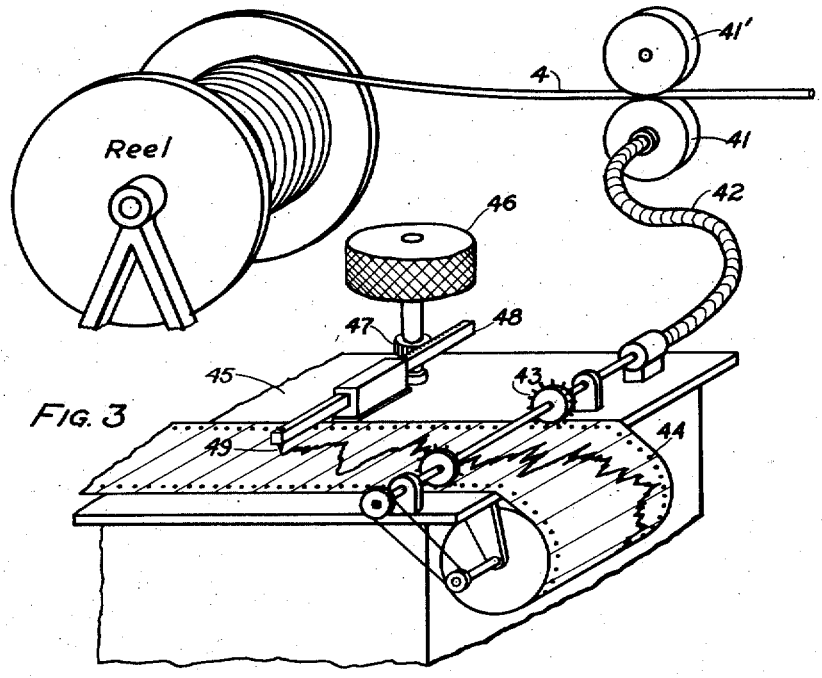
Figure 3 illustrates a form of recording apparatus for obtaining a continuous record of variations in the subsurface as the electrode system traverses the drill-hole.

Various types of indicating or recording equipment may be employed for the surface measurements. In Figure 3 is illustrated a manually operated condenser, mechanically connected to a recording stylus, whereby constant records may be made of the variation in capacity, as the electrode system traverses the drill hole. The cable 4 passes through measuring wheels 41 and 41'; connected by means of a flexible coupling 42 to a drive sprocket 43, engaged with a recording tape 44, having proper perforations to receive sprocket 43. The condenser 45 is of a variable type and manually operated by means of knob 46. Fastened to the knob or its shaft is a pinion 47, engaging rack 48. The rack operates a constantly recording pen or pencil 49 which describes a continuous record on the recording paper 44. The recording paper 44 is moved forward in accordance with movements of the cable through the measuring wheels 41 and 41'. The drive 42 may be connected to either wheel 41 or 41', depending upon direction of rotation desired. By means of this arrangement an operator can make a continuous graph of the dielectric capacity of the subsurface materials by properly operating knob 46 in order to maintain null point readings on the bridge indicating device 20, shown in Figure 1B. The wattmeter 53 of Figure 1A, and the phase-meter 55 of Figure 1C, are preferably of the continuous photographic recording type.

Figure 4:
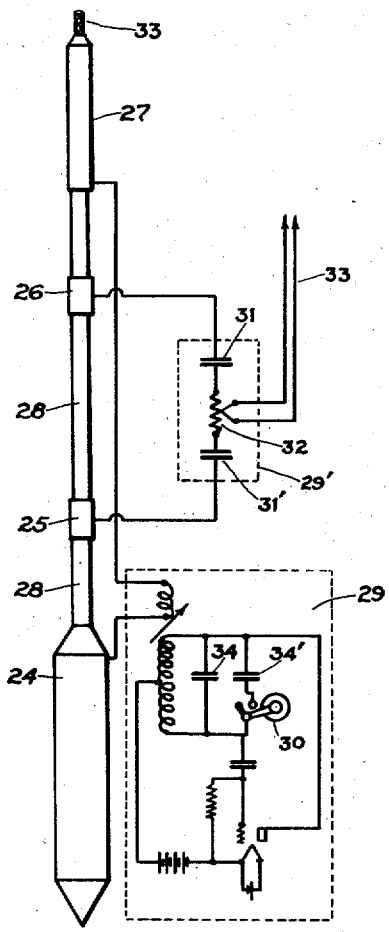
Figure 4 is a diagrammatic representation of apparatus useful for energizing the earth by two subsurface power electrodes, and measuring the potentials between two auxiliary electrodes.

An alternative system is illustrated in Figure 4, and utilizes measurement of the potential existing between two electrodes, wherein the path of a high-frequency current flow. Measurements at two or more frequencies allow the approximate dielectric constants of the various materials, in the vicinity of the electrodes, to be calculated. Referring to Figure 4, a sealed tubular metallic housing 24 contains the necessary apparatus 29, for generating the high-frequency current, and the potential measuring apparatus 29'. This housing also forms one of the energizing electrodes. At the upper end of the housing is fastened an insulative support 28, on which are placed three other extended electrodes. The uppermost electrode 27, and the housing 24, comprise the two energizing electrodes. These electrodes are electrically connected to the high-frequency supply. The two electrodes 26 and 25 constitute the two potential electrodes and are electrically connected to the potential measuring device. Two blocking condensers 31 and 31' are provided to prevent stray low-frequency and direct currents from affecting the potential measuring device 32. The potential measuring device illustrated in Figure 4 is a very high resistance vacuum thermocouple 32, having its heater connected to the electrodes 25 and 26. The thermoelectric junction is connected to the terminals of a two conductor insulated cable 33. Suitable recording or indicating instruments are connected to the other end of the cable, at the surface of the ground, for noting the variations in potential set up in the thermocouple. A clock mechanism 30, or other switching means, is provided for connecting an auxiliary capacity 34' in shunt with the initial tuning capacity 34, in order to shift the frequency of the energizing circuit. This clock mechanism is usually timed to allow measurements to be made at one frequency during descent into the well, and at another frequency during ascent from the well. It will be seen that the potential existing across the inner electrodes will depend not only upon the impedance of the material through which the system is passing, but also upon any variations in the current flow between the outer electrodes. No provision is made in this case for a constant current system and as a result, we obtain distorted values that are not in linear proportion to the high-frequency impedance of the medium. The values are distorted to a higher power and do not have the linear relationship which would exist if a constant current system were employed. In many cases this is of advantage inasmuch as it amplifies smaller variations of impedance of the subsurface strata. Use of this method suffers a disadvantage in not being able to calculate the results in terms of unit values; that is, values per cubic centimeter, etc. The data are comparative only.

Figure 5:
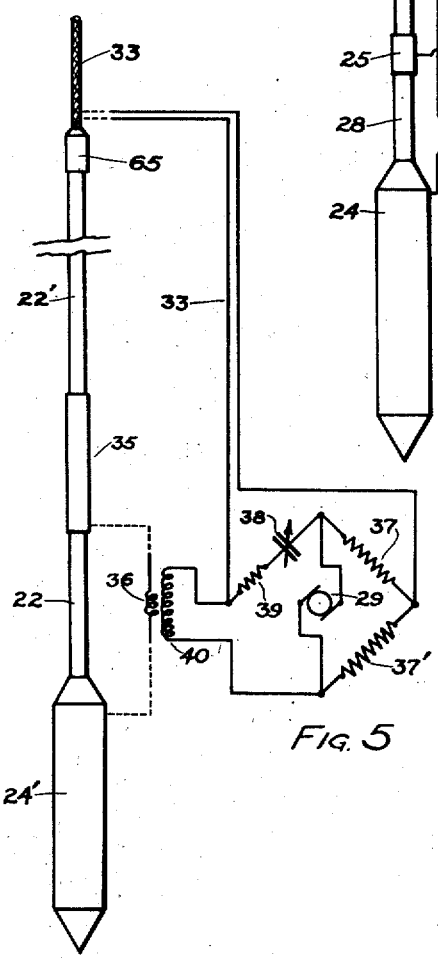
Figure 5 is a diagrammatic representation of another form of apparatus useful in measuring impedance and capacity variations.

In order to obtain an approximately linear relationship between deflection and impedance, the alternative arrangement shown in Figure 5 may be employed. In this case the source of high-frequency power 29 is connected to the arms of a bridge circuit comprising similar resistances 37 and 37'. In the other leg of the bridge is a condenser 38, resistor 39; and the winding of a transformer 40. The secondary winding 36 of the transformer is connected to the two extended electrodes 24' and 35. An insulator support 22' is provided for properly insulating the terminal 35 from the braided shield of the cable and its terminal clamp. The indicating device preferably consists of an electrostatic voltmeter connected to the bridge by means of the cable 33.

In Figure 6 is illustrated diagrammatically a system advantageous for obtaining variations in power factor as the electrode system traverses the drill-hole. A two-conductor cable, having insulated wires 59 and 60, and a grounded steel supporting sleeve 61, serves to connect the electrode system with the surface apparatus. Power is supplied through electrodes 62 and 63, connected to conductors 59 and 61 respectively. Potential is measured between electrodes 64 and 63, connected to conductors 60 and 61 respectively. The power-factor measuring instrument is of a modified type shown in Figure 1C. The in-phase potential coil 56 is connected by the conductors 60 and 61 to the electrodes 64 and 63. The reactive coil 57 is shunted across the alternating current supply 50. The load current coil 58 is connected in series with electrode 63, by means of conductor 61. This apparatus allows data to be obtained showing the variations in power-factor or phase relations of the current flowing between the electrodes 62 and 63, and the potential existing between electrodes 64 and 63. The greater the dielectric value of the materials adjacent the electrode system, the greater will be the power-factor or phase shift between the current and potential. These data therefore allow differentiation of the subsurface materials.

In practically all resistivity measuring devices, wherein low frequencies and direct current are employed, it is practically impossible to obtain a constant contact resistance. When employing high frequencies, however, I have found that a practically constant, high-frequency impedance can be obtained by using large extended electrodes. This is due to the very high capacity existing at the surface of the electrodes, which allows a high-frequency current to flow without any undue contact resistance. The use of large extended electrodes in a measuring instrument of this type is essential to proper operation of the equipment and constitutes an important feature of this development. When using the two-electrode system shown in Figure 1, and modifications thereof, it is preferable that the current density, at the electrodes be maintained at less than one-half milliampere per square centimeter.

The electrode material should preferably be of an oxidizable material, such as aluminum, tantalum, etc. The higher the resistance of the film over the electrodes, the less becomes the effect of variations in contact resistance, when employing high-frequency, alternating current as contemplated by this invention.

It is usually advantageous to "tune" the measuring system (which includes the measuring apparatus, cable and reel, and electrode system) to approximately the resonant frequency. This allows more accurate measurement of the alternating current characteristics which vary with the capacity changes, caused by variations in the dielectric properties of the strata within the sphere of influence of the electrode system.

In obtaining measurements according to any one of the specific procedures above described, it will be seen that a system of spaced electrodes is lowered into the drill-hole, and measurements are made with said electrodes at different depths. The measurements obtained at each position of the electrodes afford an indication of the alternating current impedance, dielectric properties, or other alternating current characteristic of the materials comprising an elementary portion of the earth formation penetrated by said drill-hole, said elementary portion constituting the portion of the earth formation electrically included between said electrodes at that position. By changing the depth of the electrodes and making measurements with the electrodes at different depths (preferably in such manner as to obtain a continuous record of the measured characteristic as the electrodes are progressively lowered or raised), so as to measure an alternating current characteristic of different elementary portions of the penetrated earth formation, I am thus enabled to determine variations in the measured characteristic with respect to depth (preferably as a continuous record of said characteristic at varying depth), throughout any desired length of the drill-hole and the earth formation penetrated thereby.

I claim:

1. An alternating-current process for determining the character and thickness of the geological formations traversed by uncased drill-holes, which consists in applying alternating current successively to different elementary portions of the formation adjacent such a drill-hole, and measuring the alternating-current phase angles between current and potential, while maintaining the system at approximately the resonant frequency of the measuring system, due to the formations encountered at different depths inside the drill-hole.

2. An alternating-current process for determining the character and thickness of the geological formations traversed by uncased drill-holes, which consists in applying alternating current to an electrode system disposed within such a drill-hole, moving said electrode system to different depths in said drill-hole, and measuring the relative alternating-current power losses caused by the different formations as said electrode system traverses the drill-hole.

3. An alternating-current process for determining the character and thickness of the geological formations traversed by uncased drill-holes, which consists in applying alternating current to an electrode system disposed within such a drill-hole, moving said electrode system to different depths in said drill-hole, and measuring the relative alternating-current power losses at approximately the resonant frequency of the measuring system caused by the different formations, as said electrode system traverses the drill-hole.

4. An alternating-current process for determining the character and thickness of the geological formations traversed by uncased drill-holes, which consists in applying alternating current to an electrode system disposed within such a drill-hole, moving said electrode sytem to different depths in said drill-hole, and measuring the relative alternating-current power losses at a constant frequency caused by the different formations, as said electrode system traverses the drill-hole.

5. An alternating-current device for determining the character and thickness of the geological formations traversed by an uncased drill-hole, comprising two electrodes of extended area; means for varying the depth of these two electrodes in the drill-hole; means for measuring the electrical impedance of the materials at and adjacent to the electrodes, whereby an approximate value for the alternating-current impedance of the formations at the depth of the two electrodes can be deduced.

6. An alternating-current device for determining the character and thickness of geological formations traversed by an uncased drill-hole, comprising two electrodes of extended area; means for varying the depth of these two electrodes in the drill-hole; means for measuring the electrical impedance, at two or more frequencies, of the materials adjacent to the electrodes, whereby an approximate value for the specific dielectric constant of the materials can be deduced.

7. A method for determining variations in earth formations penetrated by a drill-hole, which comprises lowering a system of electrodes in a drill-hole, moving said electrodes to different depths within said drill-hole, supplying alternating current to said electrodes at different depths, and measuring the alternating current impedance of the elementary portion of the penetrated earth formation included electrically between said electrodes at each of said depths.

8. A method for determining variations in earth formations penetrated by a drill-hole, which comprises lowering a system of electrodes in a drill-hole, moving said electrodes to different depths within said drill-hole, supplying alternating current to said electrodes at different depths, and measuring changes in the alternating current phase angle caused by the elementary portion of the penetrated earth formation included electrically between said electrodes at each of said depths.

9. A method for determining variations in earth formations penetrated by a drill-hole, which comprises lowering a system of electrodes in a drill-hole, moving said electrodes to different depths within said drill-hole, supplying alternating current to said electrodes at different depths, and measuring changes in the alternating current power losses caused by the elementary portion of the penetrated earth formation included electrically between said electrodes at each of said depths.

10. A method for determining variations in earth formations penetrated by a drill-hole, which comprises lowering a system of electrodes in a drill-hole, moving said electrodes to different depths within said drill-hole, supplying alternating current to said electrodes at different depths, and measuring changes in the dielectric properties of the elementary portion of the penetrated earth formation included electrically between said electrodes at each of said depths.

11. A method for determining variations in earth formations penetrated by a drill-hole, which comprises lowering a system of two pairs of electrodes in the liquid within a drill-hole, moving said electrodes to different depths within said drill hole, supplying high-frequency alternating current to one pair of electrodes at different depths, and measuring the potential created across an elementary portion of the penetrated earth formation included electrically between the remaining pair of electrodes at each of said depths.

12. The invention as set forth in claim 11, with the added provision that the frequency be held constant at one value during descent of the hole, and at another value during ascent of the hole.

13. A method for determining variations in earth formations penetrated by a drill-hole, which comprises lowering a system of electrodes in the liquid within a drill-hole, moving two or more of said electrodes to different depths within said drill-hole, energizing the earth adjacent said drill-hole with high-frequency alternating current, and measuring the potential created across an elementary portion of the penetrated earth formation included electrically between two electrodes at each of said depths.

14. The invention as set forth in claim 13, with the added provision that the frequency be held constant at one value during descent of the hole, and at another value during ascent of the hole.

15. The method of determining the physical characteristics of subterranean formations adjacent a bore hole which includes: lowering a pair of vertically spaced electrodes into said bore hole; applying an electrical potential to said electrodes; and measuring the capacitance of the resultant circuit which includes a predetermined volume of formation surrounding the bore hole between said electrodes.

16. A method for determining at different depths within a drill-hole the character and thickness of the strata traversed thereby, which method comprises lowering therein an electrode connected in a circuit whereof the other end is grounded, causing an alternating current to flow through said circuit, moving said electrode to different depths within said drill-hole, and taking measurements indicative of variations in impedance, comprising resistance and another electrical characteristic of the subsoil formations, the frequency of said alternating current being such that the impedance of the strata differs appreciably in magnitude from the resistance thereof.

17. A method for determining at different depths within a drill-hole the character and thickness of the strata traversed thereby, which method comprises lowering therein an electrode connected in a circuit whereof the other end is grounded, causing an alternating current to flow through said circuit, moving said electrode to different depths within said drill-hole, and taking measurements indicative of variations in impedance, comprising both resistance and reactance of the subsoil formations, the frequency of said alternating current being such that the impedance of the strata differs appreciably in magnitude from the resistance thereof.

18. A method for determining variations in earth formations penetrated by a drill hole, which comprises lowering a system of electrodes and a source of alternating current in a drill hole, moving said electrodes and source to different depths within said drill hole, supplying alternating current from said source to said electrodes at different depths, and measuring the electrical impedance of an elementary portion of the penetrated earth formation included in the path of the current flowing between said electrodes at each of said depths, produced by the flow of the alternating current therethrough.

19. A method for determining variations in earth formations penetrated by a drill hole, which comprises lowering a pair of electrodes and a source of alternating current in a drill hole, moving said electrodes and source to different depths within said drill hole, supplying alternating current from said source to said electrodes at different depths, and obtaining indications of the alternating current impedance of an elementary portion of the penetrated earth formation included in the path of the current flowing between said electrodes at each of said depths.

20. A device for determining the character and thickness of the geological formations traversed by a drill hole, which comprises a source of alternating current adapted to be lowered in a drill hole, a system of electrodes connected to said current source, means for varying the depth of the electrodes and source in the drill hole, and means for obtaining indications of the electrical impedance of the materials in the neighborhood of the electrodes, whereby an approximate value for said electrical impedance of the formations at the depth of the electrodes can be deduced.

21. An alternating current device for determining the character and thickness of the geological formations traversed by a drill hole, which comprises a source of alternating current adapted to be lowered in a drill hole, a pair of electrodes connected to said current source, means for varying the depth of the electrodes and source in the drill hole, and means for obtaining indications of the alternating current impedance of the materials in the neighborhood of the electrodes, whereby an approximate value for the alternating current impedance of the formations at the depth of the electrodes can be deduced.

JOHN JAY JAKOSKY.